United States Patent [19]

Malaval

[11] 4,104,121

[45] Aug. 1, 1978

[54] SOLID ABSORBENT SAFETY DEVICE FOR A NUCLEAR REACTOR

[75] Inventor: Claude Malaval, Antony, France

[73] Assignee: Groupement Atomique Alsacienne Atlantique, Le Plessis Robinson, France

[21] Appl. No.: 659,194

[22] Filed: Feb. 19, 1976

Related U.S. Application Data

[63] Continuation-in-part of Ser. No. 365,946, Jun. 1, 1973, abandoned.

[30] Foreign Application Priority Data

Jun. 2, 1972 [FR] France .................. 72.19990

[51] Int. Cl.² .............................................. G21C 7/22
[52] U.S. Cl. ............................. 176/86 R; 176/DIG. 5
[58] Field of Search ................. 176/86 R, 22, DIG. 5, 176/36 R, 91 R

[56] References Cited

U.S. PATENT DOCUMENTS

| | | | |
|---|---|---|---|
| 2,872,343 | 2/1959 | Eubank et al. ................. | 176/91 R |
| 2,987,455 | 6/1961 | Huston et al. ................. | 176/DIG. 5 |
| 3,024,181 | 3/1962 | Howard et al. ................. | 176/91 R |
| 3,105,033 | 9/1963 | Camac ............................ | 176/22 |
| 3,115,453 | 12/1963 | Paget et al. .................... | 176/DIG. 5 |
| 3,126,323 | 3/1964 | Leggett et al. ................. | 176/91 R |
| 3,192,123 | 9/1965 | Costes et al. ................... | 176/22 |
| 3,507,748 | 4/1970 | Fenech et al. .................. | 176/86 R |

FOREIGN PATENT DOCUMENTS

| | | | |
|---|---|---|---|
| 2,188,248 | 1/1974 | France ............................. | 176/DIG. 5 |
| 908,456 | 10/1962 | United Kingdom ............ | 176/DIG. 5 |
| 1,195,670 | 6/1970 | United Kingdom ............ | 176/DIG. 5 |

*Primary Examiner*—Harvey E. Dehrend
*Attorney, Agent, or Firm*—Sughrue, Rothwell, Mion, Zinn & Macpeak

[57] ABSTRACT

Solid absorbent in particle form stored in an intermediate chamber at a position above the reactor core within a safety device container under fluid pressure is driven by the escape of the pressure fluid along a series path from the upper compartment to the lower compartment, into the lower compartment to shut down the reactor when a destructible seal within a pipe carried in the lower compartment ruptures in response to reactor malfunction.

3 Claims, 2 Drawing Figures

SOLID ABSORBENT SAFETY DEVICE FOR A NUCLEAR REACTOR

This is a continuation-in-part application of application Ser. No. 365,946 filed June 1, 1973, identically entitled, now abandoned.

BACKGROUND OF THE INVENTION

1. Field of the Invention

The present invention relates to a safety device designed to reduce the reactivity of a nuclear reactor by the rapid introduction of solid absorbent in particle form by fluid flow into a space located in the core of the reactor.

2. Description of the Prior Art

All reactors are provided with devices for mechanically introducing an absorbent barrier into the core. However, these devices comprise a large number of mechanical parts constituting a constant source of breakdowns. Furthermore, most of these devices comprise an energy source outside the reactor. External manipulation is required to activate the energy source and release these devices. This increases the operating delay and reduces reliability.

SUMMARY OF THE INVENTION

The safety device according to the present invention obviates the above disadvantages by storing the absorbent just above the core and by using the energy of the gas stored under pressure in the reactor to cause the absorbent to drop down. As the absorbent only has to drop from the level of the core, the response time is extremely short. This is further ensured in that the devices according to the invention are released automatically and require no external manipulation.

The solid absorbent safety device according to the invention consists of a vertical, cylindrical, reservoir filled with gas under pressure comprising an upper part situated in the reactor above the core and provided with elements for keeping the solid absorbent slightly above the core and a lower part situated in the core of the reactor and provided with a connection to the outside terminated by a closing member situated in the core. The seal tightness of this member depends on the operating conditions of the reactor.

When the reactor begins to malfunction (due to an explosion, breakdown of the cooling circuit, power build-up . . .) the closing member is partially destroyed and the lower part of the reservoir depressurizes rapidly so that the solid absorbent is urged into the lower part by the relaxation of the gas from the upper part of the reservoir.

The choice of closing element depends on the parameter which is desired to keep under surveillance in the reactor. According to a first embodiment, a uranium cap sensitive to the neutronic flow and brazed on its periphery with a fusible metal, is used.

According to a feature of the invention, the solid absorbent is in the form of a powder and the reservoir comprises a first partition separating the lower part from the upper part, a second partition situated above the first partition and defining with the same an intermediate compartment, a vertical, axial pipe bringing the part of the reservoir situated above the second partition into communication with the bottom of the intermediate compartment, an annular conduit bringing the upper part of the intermediate compartment into communication with the lower part of the reservoir, a helicoidal blade going from the bottom of the intermediate compartment towards the top of this compartment and on which is disposed the pulverulent absorbent, and at least one helicoidal blade situated in the annular conduit.

Other objects, features and advantages of the present invention will be made apparent from the following detailed description of the preferred embodiment thereof provided by way of a non-limitative example only, with reference to the accompanying drawings.

DESCRIPTION OF THE PREFERRED EMBODIMENTS

Figure 1:
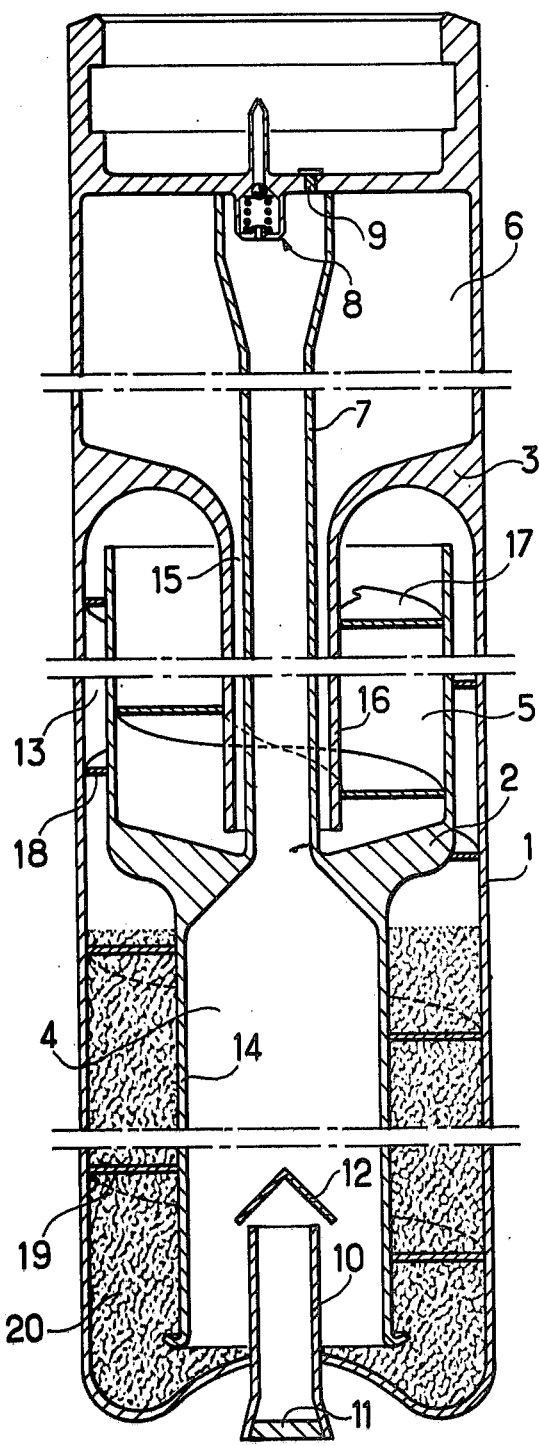
FIG. 1 is a sectional elevational view of a safety device according to the invention utilizing a pulverulent absorbent prior to pressurizing the tank and placement in the reactor core.
Figure 2:
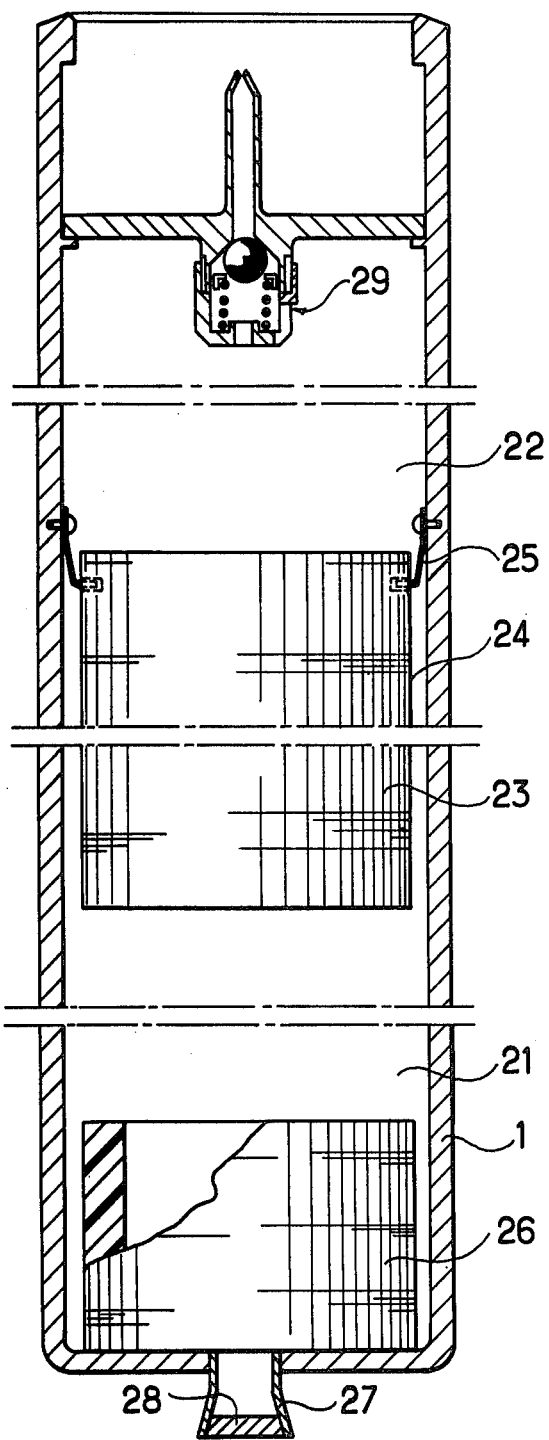
FIG. 2 is a similar sectional elevation of the safety device as in FIG. 1 at the moment of plug release during operation within the reactor core.

The safety device shown in FIG. 1 utilizes an absorbent in powder form and comprises a cylindrical, vertical reservoir or tank 1 closed at its two ends and divided in the axial direction by two transverse partitions 2 and 3 into three compartments, a lower compartment 4, the height of which is equal to the height of the core of the reactor, an intermediate compartment 5 and an upper compartment 6.

The lower compartment 4 is brought into communication with the top of the reservoir 1 by a vertical pipe 7 which extends through the intermediate compartment 5 coaxial to the reservoir and opening outside via a valve 8 and by a plugged orifice 9. The lower compartment 4 communicates with the space situated below the reservoir 1 by a vertical pipe 10 coaxial to the reservoir and obstructed at its lower part by a closing member 11. This vertical pipe 10 also comprises a conical, protecting cover 12 overlying its upper end and supported by wall 14 through strips 12a extending therebetween.

The closing member 11 is a uranium cap brazed on its periphery to the inner wall of pipe 10 with a fusible metal 11b at a predetermined temperature. The uranium cap may comprise naturally occurring uranium suitably coated with a protective shield such as a neutral metal, as for instance nickel, as indicated at 11a, the uranium coated with the nickel and forming the cap is brazed at its periphery by way of the fusible metal 11b. The braze material may vary, depending upon whether the reactor is a gas cooled reactor, a water cooled reactor or a fast sodium cooled reactor.

The intermediate compartment 5 communicates with the lower compartment 4 by way of an annular conduit 13 located between the inner wall of the reservoir 1 and a cylindrical wall 14 and going from the top part of the intermediate compartment 5 to the lower part of the lower compartment. The annular conduit is small in section above the partition 2 and its section increases below this partition.

The upper compartment 6 communicates with the intermediate compartment by an annular conduit 15 lying between the pipe 7 and another pipe 16 enclosing the pipe 7 and running from the partition 3 to end in the region of the partition 2.

A helicoidal blade 17 is disposed in the intermediate compartment 5 between the pipe 16 and the wall 14 to form a helical flow path.

A second helicoidal blade 18 is provided in the narrow section of the conduit 13 between the wall of the reservoir 1 and the wall 14 and a third helicoidal blade 19 is provided in the wide section of the conduit 13 and defining a given helical flow path.

The pulverulent absorbent safety device represented in FIG. 1 operates as follows:

The lower compartment 4 is progressively filled with pulverulent absorbent 20, for example, boron carbide, by way of the orifice 9. This orifice is then sealed by the plug as shown in FIG. 1. The powder is then urged into the part of the annular conduit 13 having a large section by successively pressurizing and decompressing the lower compartment 4 by way of the valve 8. The gas injected may, for example, be argon or helium.

The pressure is increased at each cycle. By rapidly pressurizing the lower compartment 4, the gas rushes below the blades 19 across the powder, fluidizes it and draws it along the blade 18 to the intermediate compartment 5. The helicoidal blade 17 of this compartment guides the fluidized powder and the centrifuging resulting from this movement makes it possible to stack the powder in successive, concentric layers on the blade 17.

The gas passes by way of the conduit 15 into chamber 6 and puts the upper reservoir under pressure.

Gas continues to be injected by way of the valve 8 into the reservoir until the pressure reached is appreciably greater than the pressure prevailing in the core of the reactor. The valve 8 is then sealed by pinching off nipple 8a.

The reservoir 1 is disposed in a casing similar to those used for the fuel and is then lowered into the reactor. The lower compartment is placed in the core of the reactor and the intermediate and upper compartments are then situated just above the core.

If an accident occurs in the reactor when the neutronic flow becomes too great, the uranium capsule 11 heats up and its brazing melts. The capsule is ejected by the gas under pressure situated in the lower compartment 4. The lower compartment 4 depressurizes rapidly and the gas under pressure in the upper and intermediate compartments rushes along the blade 17, fluidizes the powder and draws it into the annular conduit 13. The powder is then deposited on the balde 19 and on the base of the lower compartment 4.

There is then an immediate reduction of the reactivity of the reactor.

Although the safety device described is most advantageous when used in the embodiment according to the invention, it can obviously be modified in various ways without departing from the scope of the invention and certain elements contained therein may be replaced by others capable of ensuring the same technical function or an equivalent technical function.

What is claimed is:

1. In combination, a nuclear reactor and a safety device,
    said nuclear reactor including:
        a reactor core having vertical cylindrical openings therein for receiving cylindrical fuel assemblies,
    said safety device comprising:
        a closed cylindrical elongated container having its lower end mounted within one of said core openings,
        said container comprising upper and lower, vertically spaced transverse partition means defining an upper compartment, an intermediate compartment and a lower compartment, with said lower compartment positioned within said core,
        pulverulent solid absorbent within said container,
        means for applying fluid under pressure to said lower compartment and to effect by pressurized fluid passage from said lower compartment through said intermediate compartment to said upper compartment passage fluidized transport of said absorbent into said intermediate compartment for storage therein, and
        an axial tube extending through the bottom of the container and having the inner end disposed within said lower comparment, and
        a closing member comprising a destructible seal whose physical destruction is responsive to neutronic flux increase under reactor malfunction sealably closing the end of said tube external of said cylindrical elongated container;
        whereby, the discharge of said fluid under pressure through said tube causes fluidized transport of said pulverulent absorbent from said intermediate compartment into said lower compartment to shut down said reactor.

2. The combination as claimed in claim 1, wherein said closing member comprises a uranium cap within said tube, said cap having its periphery brazed to the interior of the axial tube by a fusible metal having a melting temperature corresponding to core temperature increase under reactor malfunction.

3. The combination as claimed in claim 1, wherein said lower partition means includes a first cylindrical wall integral with and extending upwardly therefrom and terminating short of the upper partition means and being spaced inwardly of and in close proximity to the inner wall of said container to define a narrow annular flow passage between said lower compartment and said intermediate compartment, and said upper partition means includes a second cylindrical wall integral therewith and extending downwardly therefrom concentrically within said first cylindrical wall and forming with said first cylindrical wall an absorbent storage area for said intermediate compartment, and a vertical pipe of a diameter less than the diameter of said second cylindrical wall extending upwardly from said lower partition to the upper end of said cylindrical container, said means for pressurizing said container comprises a ball check valve within the upper end of said elongated container and opening to said vertical pipe, and said container further comprises helicoidal blades extending respectively on both sides of said first cylindrical wall and within the lower compartment along the wall of said container to define helical passage means for said pulverulent absorbent.

* * * * *